United States Patent [19]
Robbins

[11] 3,814,861
[45] June 4, 1974

[54] VEHICLE MULTIPLEX CIRCUIT HAVING FUNCTION PRIORITY

[75] Inventor: Samuel B. Robbins, Rochester, Mich.

[73] Assignee: General Motors Corporation, Detroit, Mich.

[22] Filed: Oct. 13, 1972

[21] Appl. No.: 299,954

[52] U.S. Cl............................ 179/15 A, 179/15 BA
[51] Int. Cl.............................................. H04j 3/16
[58] Field of Search............ 340/184, 168 R, 167 A, 340/167 R, 206, 52 F; 179/15 BA, 15 A

[56] References Cited
UNITED STATES PATENTS

| | | | |
|---|---|---|---|
| 3,544,803 | 12/1970 | Taylor | 340/168 R |
| 3,646,274 | 2/1972 | Naur | 179/15 BA |
| 3,651,454 | 3/1972 | Venema | 340/52 F |
| 3,678,512 | 7/1972 | Fergus | 340/167 A |
| 3,742,447 | 6/1973 | Sognefest | 340/52 F |

Primary Examiner—William C. Cooper
Assistant Examiner—David L. Stewart
Attorney, Agent, or Firm—Howard N. Conkey

[57] ABSTRACT

A power line, an address line and a plurality of flip-flops for generating sequential time slots are displaced around a vehicle. A function control center transmits clocking pulses to the flip-flops which sequentially generate time slots associated respectively with each function which can be performed on the vehicle and transmits an address signal on the address line synchronized with the time slot associated with a selected function to be performed to effect the initiation of that function. The function control center provides one form of control in which a control switch continually controls a function associated therewith while said switch is actuated and a second form of control in which another control switch is effective for initiating a function associated therewith, which function is continually performed until yet another control switch is actuated to terminate the function. The function control center also includes a priority circuit which momentarily disrupts the first form of control to permit the second form of control to effect a selected operation after which the first form of control is again made effective.

2 Claims, 4 Drawing Figures

VEHICLE MULTIPLEX CIRCUIT HAVING FUNCTION PRIORITY

This invention relates to a vehicle multiplex circuit for controlling various vehicle functions and more specifically, this invention relates to a vehicle multiplex circuit for controlling vehicle functions in which a first form of control is provided which gives the vehicle operator continuous control over given functions and a second form of control in which other functions are initiated or terminated by the vehicle operator with the interim period being out of the control of the vehicle operator and in which the second form of control has priority over the first form of control.

Present vehicle electrical systems require extensive wiring harnesses resulting from the use of a separate wire for each function to be performed in items such as turn signals, headlights, back-up lights, brake lights, power windows and seats, etc. Multiplex systems using ring counters for reducing the complexity of these wiring harnesses have been suggested but these systems provide for only one form of control. This is not desirable in that performing a function such as energizing a power window motor, it is preferred to maintain the energization of the power window motor under the control of the vehicle operator in that the operator is required to maintain the power window motor switch depressed to energize the power window motor, while in performing a function such as turning on the vehicle headlights, it is desirable to energize the light circuit by only a momentary actuation of the lights-on switch, after which the lights are continually energized until a lights-off switch is actuated. It is, therefore, the general object of this invention to provide a vehicle multiplex circuit having a first form of control which maintains a function under the continuous control of the vehicle operator and a second form of control in which the momentary actuation of a switch of the vehicle operator is effective for energizing a particular function which is threafter maintained energized until deenergized by the vehicle operator.

When the two aforementioned forms of control are provided, it is also desirable to insure that while a power window motor is energized and under the control of an operator, the actuation of a switch associated with certain critical functions can yet be effective for initiating those functions. Therefore, it is another object of this invention to provide a multiplex circuit having two forms of control whereby one form of control takes priority over the second form of control.

These and other objects of this invention may be best understood by reference to the following description of a preferred embodiment and the drawings in which.

Figure 1:
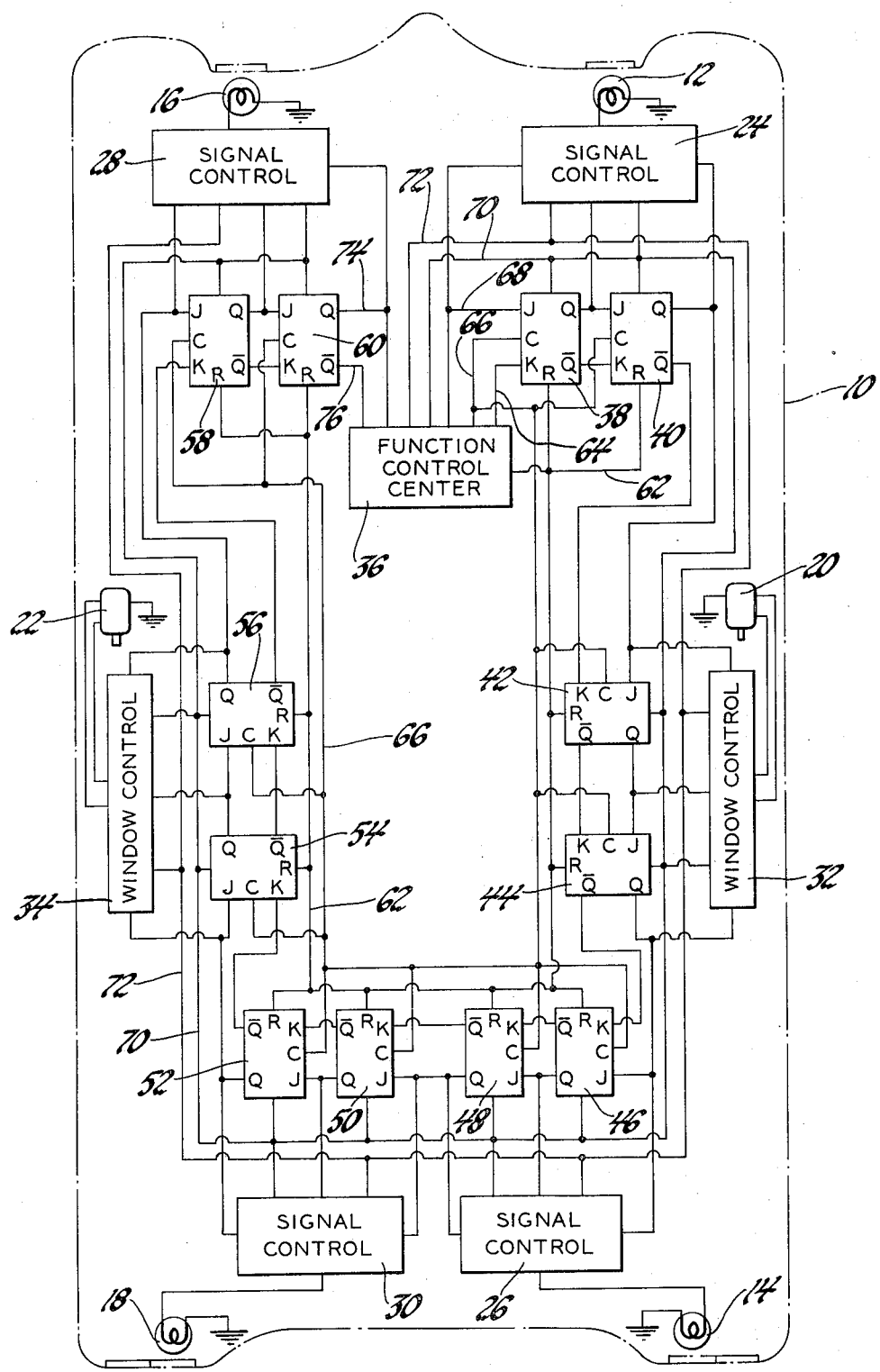
FIG. 1 is a schematic drawing illustrating the invention with respect to the control of vehicle turn signal lamps and power window motors.

Referring to FIG. 1, a vehicle 10 includes a right front turn signal lamp 12, a right rear turn signal lamp 14, a left front turn signal lamp 16 and a left rear turn signal lamp 18. The vehicle 10 also includes a right power window motor 20 and a left power window motor 22 for positioning the right and left windows, respectively. A plurality of signal control circuits 24, 26, 28 and 30 control respectively the turn signal lamps 12, 14, 16 and 18. A pair of window control circuits 32 and 34 control the power window motors 20 and 22, respectively. Each of the signal control circuits 24, 26, 28 and 30 has two functions. The first function is to initiate the flashing of the respective lamp 12, 14, 16 and 18 associated therewith and the second function is to terminate the flashing of the respective lamp 12, 14, 16 and 18 associated therewith. Also, each window control circuit 32 and 34 has two functions. The first function is to control the power window motors 20 and 22 so as to position the right and left windows respectively upward and the second function is to control the power window motors 20 and 22 so as to position the right and left windows respectively downward.

A multiplex circuit is provided to control the signal control circuits 24, 26, 28 and 30 and the window control circuits 32 and 34 and includes a function control center 36 and a plurality of J-K flip-flops 38, 40, 42, 44, 46, 48, 50, 52, 54, 56, 58 and 60. Each of the J-K flip-flops 38 through 60 is associated with a respective function to be performed as follows: The flip-flop 38 is associated with the flashing of the right front turn signal lamp 12, the flip-flop 40 is associated with the deenergization of the right front turn signal lamp 12, the flip-flop 42 is associated with the positioning of the right window upward, the flip-flop 44 is associated with the positioning of the right window downward, the flip-flop 46 is associated with the flashing of the right rear turn signal lamp 14, the flip-flop 48 is associated with the deenergization of the right rear turn signal lamp 14, the flip-flop 50 is associated with the flashing of the left rear turn signal lamp 18, the flip-flop 52 is associated with the denergization of the left rear turn signal lamp 18, the flip-flop 54 is associated with the positioning of the left window upward, the flip-flop 56 is associated with the positioning of the left window downward, the flip-flop 58 is associated with the flashing of the left front turn signal lamp 16, and the flip-flop 60 is associated with the deenergization of the left front turn signal lamp 16.

The Q and $\bar{Q}$ outputs of the flip-flops 38, 40, 42, 44, 46, 48, 50, 52, 54, 56 and 58 are coupled respectively to the J and K inputs of the flip-flops 40, 42, 44, 46, 48, 50, 52, 54, 56, 58 and 60.

The function control center 36 supplies a reset pulse to the flip-flops 38 through 60 through a line 62, supplies ground potential to the K input of the flip-flop 38 through a line 64, supplies clocking pulses to the flip-flops 38 through 60 through a line 66, supplies a positive voltage to the J input of the flip-flop 38 through a line 68, supplies power to the flip-flops 38 through 60, the signal control circuits 24, 26, 28 and 30 and the window control circuits 32 and 34 through a line 70 and supplies an address signal through a line 72 to the signal control circuits 24, 26, 28 and 30 and the window control circuits 32 and 34. The Q output of the flip-flop 60 is coupled to the function control center 36 through a line 74 and the $\bar{Q}$ output of the flip-flop 60 is supplied to the function control center through a line 76.

The flip-flops 38 through 60 are responsive to signals shifting from a positive voltage to ground potential applied to the clock inputs thereof for shifting its Q output from ground potential to a positive voltage level and its $\bar{Q}$ output from a positive voltage level to ground potential when its J input is at a positive voltage level. This form of flip-flop is well known in the art and will not be described in greater detail.

The flip-flops 38 through 60 function to generate respective time slots. As hereinafter referred to, a time slot generated by a flip-flop is defined as the time period that the J input and the Q output thereof is a positive voltage and ground respectively. During the respective time slots generated by the flip-flops 38 through 60, the function associated therewith can be performed as will be described. As can be seen, when all of the flip-flops 38 through 60 are reset, a time slot is supplied by the flip-flop 38 in that the J input thereof through the line 68 from the function control center 36 is a positive voltage and its Q output is at ground. When the function control center 36 supplies a clock pulse on the line 66, the Q output of the flip-flop 38 shifts to a positive voltage level, at which time the flip-flop 40, whose J input is then a positive voltage level and whose Q output is at ground potential, generates a time slot. In this manner, as clocking pulses are sequentially supplied by the function control center 36 through the line 66, the flip-flops 38 through 60 cyclically generate a number of sequential time slots.

The J inputs and Q outputs of the flip-flops 38 and 40 defining the time slots generated thereby are supplied to the signal control circuit 24, the J inputs and Q outputs of the flip-flops 42 and 44 defining the time slots generated thereby are supplied to the window control circuit 32, the J inputs and Q outputs of the flip-flops 46 and 48 defining the time slots generated thereby are supplied to the signal control circuit 26, the J inputs and Q outputs of the flip-flops 50 and 52 defining the time slots generated thereby are supplied to the signal control circuit 30, the J inputs and Q outputs of the flip-flops 54 and 56 defining the time slots generated thereby are supplied to the window control circuit 34, and the J inputs and Q outputs of the flip-flops 58 and 60 representing the time slots generated thereby are supplied to the signal control circuit 28.

When it it desired to perform a desired function, the function control center 36 supplies the address signal on the line 72 synchronized with the generation of a time slot by the flip-flop 38, 40, 42, 44, 46, 48, 50, 52, 54, 56, 58 or 60 associated with that particular function. The respective signal control circuit 24, 26, 28 or 30 or the window control circuit 32 or 34 is responsive to the coexistence of the generated time slot and the address signal for performing that function.

Figure 2:
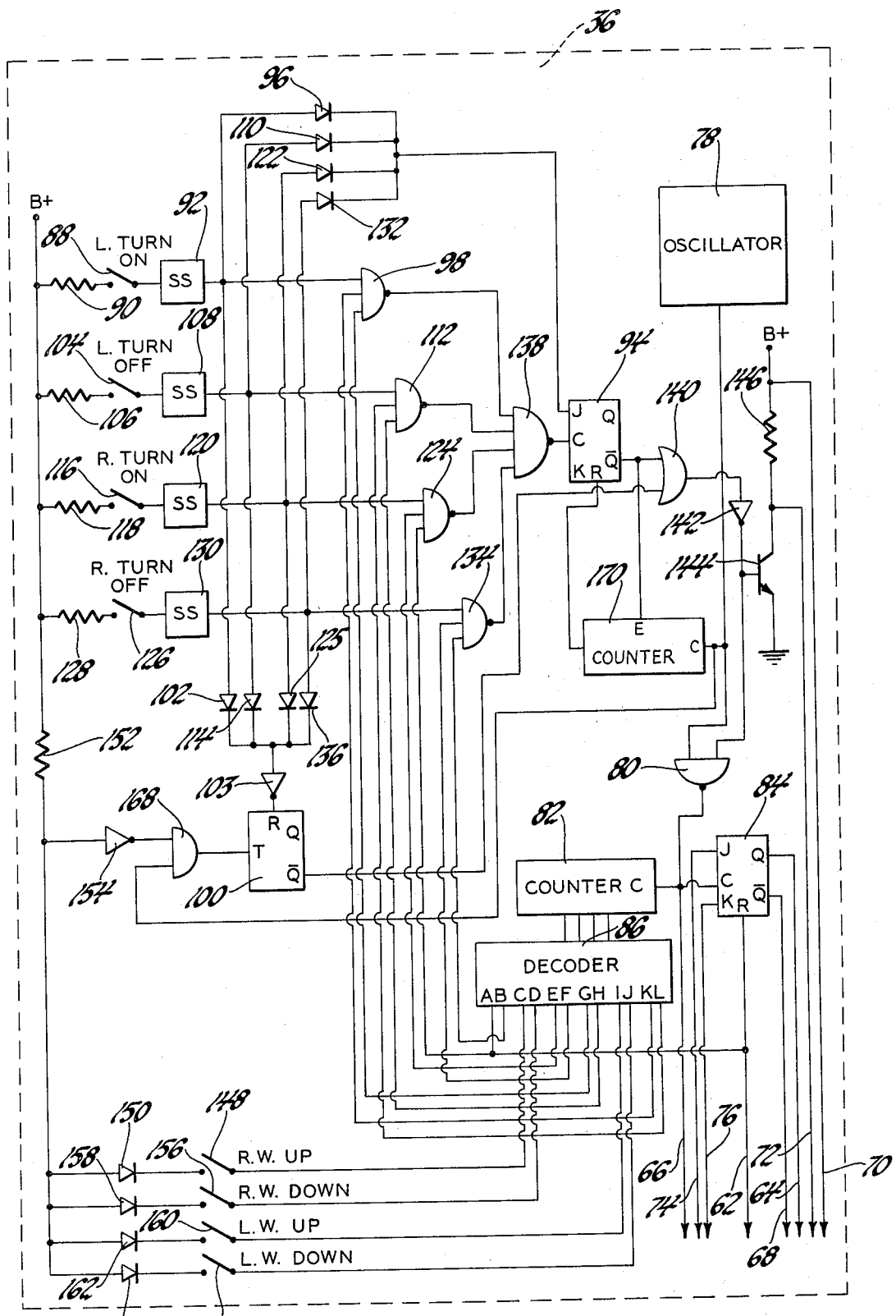
FIG. 2 is a schematic drawing of the function control center of FIG. 1.

Referring to FIGS. 1 and 2, the function control center 36 includes an oscillator 78 which supplies a series of positive pulses at a predetermined frequency to one input of a two input NAND gate 80. Assuming the second input to the NAND gate 80 is at a positive voltage level, the output of the NAND gate 80 constitutes the series of clock pulses supplied to the line 66 which are an inverted form of the output of the oscillator 78. These clock pulses are supplied to the clock input of a counter 82 and the clock input of a J-K flip-flop 84. The Q output of the flip-flop 84 is supplied to the line 64 which is coupled to the K input of the flip-flop 38 and the $\bar{Q}$ output of the flip-flop 84 is supplied to the line 68 which is coupled to the J input of the flip-flop 38. The J and K inputs of the flip-flop 84 are coupled respectively to the lines 74 and 76.

The counter 82 is a binary counter having a number of stages which counts the clock pulses supplied to the clock input thereof up to a count of eleven and whose stages are all reset on the twelfth clock pulse. This type of counter, including the internal means for resetting its stages after a predetermined count, is well known to one skilled in the art and consequently will not be described in greater detail.

The output of the stages within the counter 82 are supplied in parallel form to a decoder 86 having outputs A through L associated respectively with a count of 0 through eleven within the counter 82. The output of the decoder 86 associated with a particular count in the counter 82 goes from a positive voltage level to ground potential while that count exists in the counter 82. As the counter 82 counts from zero to eleven, the outputs A through L thereof are sequentially shifted to ground potential in accordance with the count in the counter 82. When the counter 82 is reset on the twelfth clock pulse, the A output of the decoder 86 corresponding thereto is at ground potential, which ground potential is supplied to the reset input of the flip-flop 84 and to the reset inputs of the flip-flops 38 through 60 through the line 62. The flip-flops 84 and 38 through 60 are reset by the ground potential supplied to their respective reset inputs. While the counter 82 is reset, the ground signal at the A output of the decoder 86 occurs simultaneously with the time slot generated by the flip-flop 38. Upon the occurrence of the next clock pulse at the output of the NAND gate 80, the B output of the decoder 86 shifts from a positive potential to ground potential simultaneously with the generation of a time slot by the flip-flop 40. In like manner, the C through L outputs of the decoder 86 correspond respectively to the time slots generated by the flip-flops 42 through 60.

A normally open switch 88 for initiating a left turn signal has one terminal coupled to a positive voltage source B+ through a resistor 90 and a second terminal coupled to a single shot multivibrator 92. The output of the signals shot multivibrator 92 is coupled to the J input of a J-K flip-flop 94 through a diode 96, to one input of a NAND gate 98 and to the reset input of a single shot multivibrator 100 through a diode 102 and an inverter 103. A normally open switch 104 for terminating a left turn signal has one terminal coupled to the positive voltage source BB+ through a resistor 106 and a second terminal coupled to the input of a single shot multivibrator 108. The output of the single shot multivibrator 108 is coupled to the J input of the flip-flop 94 through a diode 110, to one input of a NAND gate 112 and to the reset input of the single shot multivibrator 100 through a diode 114 and the inverter 103. A normally open switch 116 for initiating a left turn signal has one terminal connected to the positive voltage source B+ through a resistor 118 and a second terminal coupled to the input of a single shot multivibrator 120. The output of the single shot multivibrator 120 is coupled to the J input of the flip-flop 94 through a diode 122, to one input of a NAND gate 124 and to the reset input of the single shot multivibrator 100 through a diode 125 and the inverter 103. A normally open switch 126 for terminating a left turn signal has one terminal coupled to the positive voltage source B+ through a resistor 128 and a second terminal coupled to an input of a single shot multivibrator 130. The output of the single shot multivibrator 130 is coupled to the J input of the flip-flop 94 through a diode 132, to one input of a NAND gate 134 and to the reset input of the single shot multivibrator 100 through a diode 136 and the inverter 103.

The A and E outputs of the decoder 86, which supply ground signals coexisting respectively with the time slots generated by the flip-flops 38 and 46, are coupled to respective inputs of the NAND gate 124. The B and F outputs of the decoder 86, which supply ground signals coexisting respectively with the time slots generated by the flip-flops 40 and 48, are coupled to respective inputs of the NAND gate 134. The G and K outputs of the decoder 86, which supply ground signals coexisting respectively with the time slots generated by the flip-flops 50 and 58 are supplied to respective inputs of the NAND gate 98. The H and L outputs of the decoder 86, which supply ground signals coexisting respectively with the time slots generated by the flip-flops 52 and 60, are coupled to respective inputs of the NAND gate 112.

The outputs of the NAND gates 98, 112, 124 and 134 are coupled to respective inputs of a NAND gate 138 whose output is coupled to the clock input of the flip-flop 94. The $\bar{Q}$ output of the flip-flop 94 is coupled to one input of an EXCLUSIVE OR gate 140 whose output is coupled to the input of an inverter 142. The output of the inverter 142 is coupled to the second input of the NAND gate 80 and to the base electrode of an NPN transistor 144. The emitter electrode of the transistor 144 is grounded and the collector electrode thereof is coupled to the positive voltage source B+ through a resistor 146. The potential at the collector electrode of the transistor 144 is supplied to the line 72 and constitutes the address signal previously referred to with reference to FIG. 1. In addition, the positive voltage source B+ is coupled to the line 70.

The C output of the decoder 86, which supplies a ground signal coexisting with the time slot generated by the flip-flop 42, is coupled to one terminal of a normally open switch 148 which is associated with the shifting of the right window upward. A second terminal of the normally open switch 148 is coupled to the cathode of a diode 150 whose anode is coupled to the positive voltage source B+ through a resistor 152 and to the input of an inverter 154. The D output of the decoder 86, which supplies a ground signal coexisting with the time slot generated by the flip-flop 44, is coupled to one terminal of a normally open switch 156 which is associated with the shifting of the right window downward. A second terminal of the normally open switch 156 is coupled to the cathode of a diode 158 whose anode is coupled to the input of the inverter 154. The I output of the decoder 86, which supplies a ground signal coexisting with the time slot generated by the flip-flop 54, is coupled to one terminal of a normally open switch 160 which is associated with the shifting of the left window upward. A second terminal of the normally open switch 160 is coupled to the cathode of a diode 162 whose anode is coupled to the input of the inverter 154. The J output of the decoder 86, which supplies a ground signal coexisting with the time slot generated by the flip-flop 56, is coupled to one terminal of a normally open switch 164 which is associated with the shifting of the left window downward. A second terminal of the normally open switch 164 is coupled to the cathode of a diode 166 whose anode is coupled to the input of the inverter 154.

The output of the inverter 154 is coupled to an input of an AND gate 168 whose output is coupled to the trigger input of the single shot multivibrator 100. The output of the oscillator 78 is coupled to a second input of the AND gate 168. The $\bar{Q}$ output of the single shot multivibrator 100 is coupled to a second input of the EXCLUSIVE OR gate 140.

The output of the oscillator 78 is further coupled to the clock input of a counter 170, the output of the last stage of which is coupled to the reset input of the flip-flop 94. The counter 170 is of the well known type having an enable input and is enabled to count the clock pulses supplied to its clock input when its enable input is at ground potential. The counter 170 functions as a time delay for resetting the flip-flop 94 a predetermined time period after the flip-flop 94 is set, the time period being determined by a given number of pulses at the output of the oscillator 78.

The single shot multivibrator 100 is of the well known variety which includes a reset terminal. The single shot multivibrator 100 is reset and maintained reset while ground potential is applied to the reset input thereof irrespective of the signals applied to its trigger input.

When all of the normally open switches 88, 104, 116, 126, 148, 156, 160 and 164 are open, the outputs of the NAND gates 98, 112, 124 and 134 are all at a positive voltage level. Consequently, the output of the NAND gate 138 is at ground potential. In addition, the flip-flop 94 and the single shot multivibrator 100 are reset and their $\bar{Q}$ outputs are at a positive voltage level. As both inputs of the EXCLUSIVE OR gate 140 are at a positive voltage level, the output thereof is at ground potential resulting in a positive voltage being supplied to the base electrode of the transistor 144 and to the NAND Gate 80 by the inverter 142. Therefore, the NAND gate 80 is enabled to supply clock pulses for clocking the flip-flops 38 through 60 as previously described and for clocking the counter 82 in synchronism therewith. In addition, the transistor 144 is biased into conduction to supply a ground signal on the line 72.

If it is desired to signal a right turn, for example, the normally open switch 166 is momentarily closed to trigger the single shot multivibrator 120 which generates a positive voltage pulse. This positive voltage pulse is coupled to the J input of the flip-flop 94 through the diode 122. In addition, the positive voltage pulse is supplied to the NAND gate 124. Assuming the flip-flops 38 and 46 are not generating a time slot at this time, the A and E outputs of the decoder 86 are both at a positive voltage level. Consequently, the output of the NAND gate 124 shifts to ground potential to cause the output of the NAND gate 138 to shift to a positive voltage level. For purposes of illustration, it is assumed that the A output of the decoder 86 shifts to a ground potential before the E output thereof, it being understood that the sequence that the A and E outputs shifts to ground potential affects only the sequence that the turn signal lamps 12 and 14 are energized. When the A output shifts to ground potential, the output of the NAND gate 124 shifts to a positive voltage level to cause the output of the NAND gate 138 to shift to ground potential which clocks the flip-flop 94. As the J input of the flip-flop 94 is a positive voltage level from the single shot multivibrator 120, the $\bar{Q}$ output thereof is shifted from a positive voltage level to ground potential. As the input to the EXCLUSIVE OR gate from the $\bar{Q}$ output of the single shot multivibrator 100 is a positive voltage level, the output thereof shifts to a positive voltage level to cause the output of the inverter 142 to shift to ground potential. Consequently, the NAND gate 80 is inhibited from supplying additional clock pulses as its output is maintained at a positive voltage level. Therefore the counter 82 and the flip-flops 38 through 60 are no longer clocked. When the A output of the decoder 86 is shifted to ground potential, the flip-flop 38 generates a time slot as previously described. This time slot is continually generated while the NAND gate 80 is inhibited from supplying additional clock pulses. When the output of the inverter 142 shifts to ground potential, the transistor 144 is biased into non-conduction. Therefore, a positive voltage is supplied on the line 72, which positive voltage constitutes the address signal previously referred to. The signal control circuit 24 is responsive to the coexistence of the time slot generated by the flip-flop 38 and the address signal to energize and flash the right front turn signal lamp 12.

When the $\bar{Q}$ output of the flip-flop 94 shifted to ground potential, the counter 170 was enabled to begin counting the output pulses from the oscillator 78. After a predetermined number of counts, a reset pulse is applied to the reset input of the flip-flop 94 which is reset thereby to cause its $\bar{Q}$ output to shift to a positive voltage level. Consequently, after a time period determined by the predetermined number of output pulses from the oscillator 78, the output of the EXCLUSIVE OR gate 140 shifts to ground potential to cause the output of the inverter 142 to shift to a positive voltage level. Thereafter, the NAND gate 80 is again enabled to supply clock pulses to the counter 82 and to the flip-flops 38 through 60. Also, the transistor 144 is biased into conduction to again supply a ground potential on the line 72. The clock pulses are again effective for sequentially generating the time slots previously referred to and for sequencing the A through L outputs of the decoder 86 in synchronism therewith.

Upon the occurrence of the first clock pulse at the output of the NAND gate 80 after the output of the inverter 142 is shifted to a positive voltage level, the A output of the decoder 86 is shifted to a positive voltage level to cause the output of the NAND gate 124 to shift to ground potential. Therefore, the output of the NAND gate 138 shifts to a positive voltage level. Upon the occurrence of the fourth clock pulse, the E output of the decoder 86 shifts to ground potential to cause the output of the NAND gate 124 to again shift to a positive voltage level. The output of the NAND gate 138 then shifts to ground potential and to clock the flip-flop 94 and effect the inhibiting of further clock pulses in the same manner as previously described. Also, upon the occurrence of the fourth clocking pulse, the flip-flop 46 of FIG. 1 generates a time slot which is supplied to the signal control circuit 26. Simultaneously therewith, the transistor 144 is biased into nonconduction to effect the generation of the address signal supplied on the line 72. The signal control circuit 26 is responsive to the coexistence of the time slot generated by the flip-flop 46 and the address signal supplied on the line 72 to energize and flash the right rear turn signal lamp 14. After a time period as determined by the counter 170, the flip-flop 94 is again reset to enable the NAND gate 80 to again supply clock pulses to the counter 82 and to the flip-flops 38 through 60 until such time that a further function is initiated by the closure of a switch such as the switch 126 for deenergizing the right turn signal lamps 12 and 14, after which the above procedure is repeated.

It can be seen that the output of the single shot multivibrators 92, 108, 120 and 130 must be of such a time duration to insure that both of the front and rear turn signal functions associated therewith are initiated. It can also be seen that if the response time of the various circuit elements such as the NAND gates 98, 112, 124, 134 and 138, the transistor 144, the signal control circuits 24, 26, 28 and 30 and the flip-flops 38 through 60 are fast enough relative to the frequency of the oscillator 78 to insure the various functions are initiated between clocking pulses, the time delay provided by the counter 170 could be eliminated and the output of the NAND gate 138 could be coupled directly to the EXCLUSIVE OR gate 140, the flip-flop 94 and the counter 170 being eliminated. Also with this modification, the output of the inverter 142 would be uncoupled from the NAND gate 80 and the $\bar{Q}$ output of the single shot multivibrator 100 would be coupled to both the EXCLUSIVE OR gate 140 and the second input of the NAND gate 80.

The control of the turn signal lamps 12, 14, 16 and 18 as previously described, represents one form of control in which the function is initiated by the momentary actuation of a switch by the vehicle operator, after which the function is continued independent of the vehicle operator until such time that a second switch is momentarily actuated to deenergize the function. For example, the normally open switch 126 is momentarily actuated to effect the deenergization of the right front turn signal lamp 12 and the right rear turn signal lamp 14 in the same manner as their energization as previously described. During this form of control, after the energization of the desired function, the multiplex circuit continues to sequence the A through L outputs of the decoder 86 and the flip-flops 38 through 60 so that additional functions can be initiated. As opposed to this form of control, the energization of the power window motors 20 and 22 represent a form of control in which the energization of the respective power window motor 20 or 22 is continually under control of the vehicle operator for as long as the normally open switch 148, 156, 160 or 164 representing the desired function is actuated. This form of control will hereinafter be described.

If it is desired to position the right window upward, the normally open switch 148 is depressed by the vehicle operator. When the C output of the decoder 86 shifts to ground potential simultaneously with the generation of a time slot by the flip-flop 42, a ground signal is applied to the input of the inverter 154 through the diode 150. The output of the inverter 154 shifts to a positive voltage level to shift the output of the AND gate 168 to a positive voltage level as the second input thereof from the oscillator 78 is a positive voltage level. The single shot multivibrator 100 is triggered by the output of the AND gate 168 to shift its $\bar{Q}$ output from a positive voltage level to ground potential to enable the EXCLUSIVE OR gate 140 to supply a positive voltage to the inverter 142. The output of the inverter 142 shifts from a positive voltage level to ground potential to inhibit the generation of further clock pulses by the NAND gate 80. Simultaneously, the transistor 144 is biased into nonconduction so as to supply the address signal on the line 72. As the $\bar{Q}$ output of the flip-flop 100 bypasses the enable input of the counter 170, (or since the $\bar{Q}$ output is directly connected to the second input of the NAND gate 80 in the modification previously described which eliminated the flip-flop 94 and counter 170) the NAND gate 80 is continually inhibited from supplying clock pulses for as long as the single shot multivibrator 100 is set.

The window control circuit 32 is responsive to the coexistence of the time slot generated by the flip-flop 42 and the address signal on the line 72 so as to control the power window motor 20 to shift the right window upward. The output of the oscillator 78 is continually supplied to the AND gate 168 so as to continually trigger the single shot multivibrator 100 which is maintained set thereby to continually supply a ground signal at the $\bar{Q}$ output thereof since the normal time duration of the output pulse of the single shot multivibrator is greater than the time period between output pulses from the oscillator 78.

Upon the release of the normally open switch 148, a positive voltage is supplied to the inverter 154 whose output shifts from a positive voltage to ground potential. Therewith, the output of the AND gate 168 is shifted to ground potential and maintained thereat irrespective of the pulses applied thereto from the oscillator 78. Thereafter, the single shot multivibrator 100 shifts its $\bar{Q}$ output from ground potential to a positive voltage level. The EXCLUSIVE OR gate 140 is responsive to the positive voltage for shifting its output from a positive voltage level to ground potential to again enable the NAND gate to supply clock pulses to the counter 82 and the flip-flop 38 through 60.

As can be seen from the foregoing, the second form of control results in the generation of a time slot associated with a particular function which is continually generated for as long as the vehicle operator desires that function to be controlled.

While a function associated with the second form of control is being performed, it is desirable to permit a function associated with the first form of control to have priority thereover. For example, when one of the power window motors 32 or 34 is energized by the vehicle operator, it is desirable to permit the energization of the turn signal lamps 12 and 14 or 16 and 18 or their deenergization immediately upon the actuation of the normally open switches associated therewith. This is accomplished by a priority circuit which operates as hereinafter described.

Assuming one of the normally open switches 148, 156, 160 or 164 is closed and the function associated therewith has been initiated, the NAND gate 80 is inhibited from supplying clock pulses to the counter 82 and the flip-flops 38 through 60, as previously described, so as to normally prevent any further functions from being initiated until the clocking pulses are again supplied thereto upon the release of the respective normally open switch 148, 156, 160 or 164. To permit the functions associated with the normally open switches 88, 104, 116 and 126 to be initiated irrespective of whether one of the normally open switches 148, 156, 160 or 164 are closed, the output of the single shot multivibrators 92, 108, 120 and 130 are coupled to the reset input of the single shot multivibrator 100 as previously described through the respective diodes 102, 114, 125 and 136 and the inverter 103 to reset the single shot multivibrator 100 for the time duration of the output of the single shot multivibrator 92, 108, 120 or 130 which was triggered by the closure of the respective switch 88, 104, 116 or 126. When the single shot multivibrator 100 is reset, the $\bar{Q}$ output thereof shifts to a positive voltage level to enable the NAND gate 80 to supply clock pulses to the counter 82 and the flip-flops 38 through 60. The time slots are again sequentially generated by the flip-flops 38 through 60 and the A through L outputs of the decoder 86 are again sequenced until the time slot generated and the output of the decoder 86 associated with the function initiated again effects the initiation thereof in the manner previously described. When the function associated with the respective switch 88, 104, 116 or 126 which is closed is initiated, further clock pulses are supplied by the NAND gate 80 as previously described until the output of the decoder 86 associated with the respective switch 148, 156, 160 or 164 which was closed shifts to ground potential which results in the return of control of that particular function to the vehicle operator until the release of the respective switch 148, 156, 160 or 164.

Figure 3:
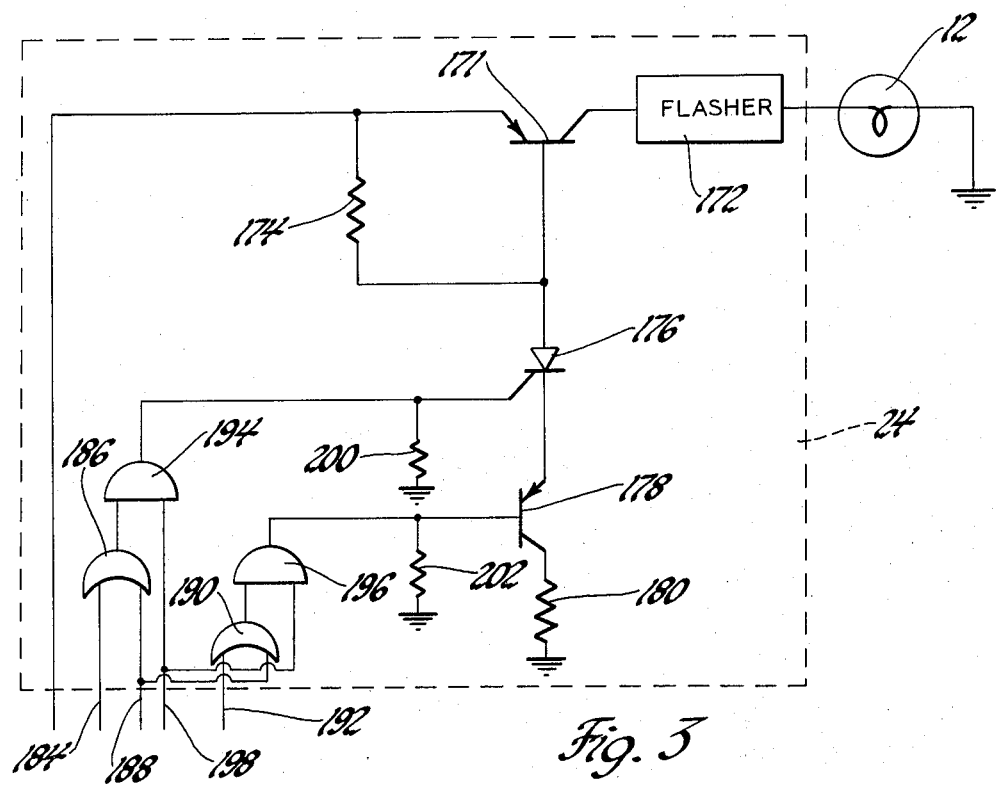
FIG. 3 is a schematic drawing illustrating the signal control circuits of FIG. 1.

Referring to FIG. 3, the signal control circuit 24 is illustrated, it being understood that the signal control circuits 14, 16 and 18 are identical.

B+ from the line 70 is coupled to the emitter electrode of a PNP transistor 171 whose collector electrode is coupled to a conventional flasher 172. The output of the flasher 172 is coupled through the right turn signal lamp 12 to ground. A resistor 174 is coupled between the emitter and base electrodes of the transistor 171. The base electrode of the transistor 170 is also coupled to the anode of an SCR 176 whose cathode is coupled to the emitter electrode of a PNP transistor 178. The collector electrode of the transistor 178 is coupled to ground through a resistor 180. The J input of the flip-flop 38 is coupled through a line 184 to one input of an EXCLUSIVE OR gate 186. The Q output of the flip-flop 38 corresponding to the J input of the flip-flop 40 is coupled through a line 188 to a second input of the EXCLUSIVE OR gate 186 and to an input of an EXCLUSIVE OR gate 190. The Q output of the flip-flop 40 is coupled through a line 192 to q second input of the EXCLUSIVE OR gate 190. The output of the EXCLUSIVE OR gate 186 is coupled to an input of an AND gate 194 and the output of the EXCLUSIVE OR gate 190 is coupled to an input of an AND gate 196. The address signal on the line 72 is coupled through a line 198 to second inputs of the respective AND gates 194 and 196. The output of the AND gate 194 is coupled to ground through a resistor 200 and to the control electrode of the SCR 176 and the output of the AND gate 196 is coupled to ground through a resistor 202 and to the base electrode of the transistor 178. When neither the flip-flop 38 nor the flip-flop 40 are generating a time slot, the inputs to the EXCLUSIVE OR gates 186 and 190 are such that their outputs are at ground potential. Upon the generation of a time slot by the flip-flop 38, the input to the EXCLUSIVE OR gate 186 through the line 184 is a positive voltage level and the input to the second input thereof through the line 188 is ground potential. Consequently, the output of the EXCLUSIVE OR gate 186 is a positive voltage level. If the address signal occurs simultaneously with the time slot generated by the flip-flop 38, a positive voltage is applied to the second input of the AND gate 194 through the line 198. Consequently, the AND gate 194 generates a positive voltage across the resistor 200 to gate the SCR 176 into conduction. As the inputs to the EXCLUSIVE OR gate 190 at this time are both at ground potential, the input to the base electrode of the transistor 178 from the AND gate 196 is ground potential which biases the transistor 178 into conduction. Consequently, a current path is provided to bias the transistor 171 into conduction to energize the flasher 172 which flashes the right front turn signal lamp 12.

When a time slot is generated by the flip-flop 40, the input to the EXCLUSIVE OR gate 190 through the line 188 is a positive voltage and the input to the second input thereof through the line 192 is ground potential. Consequently, the output of the EXCLUSIVE OR gate 190 is a positive voltage level supplied to the AND gate 196. If an address signal is applied to the second input of the AND gate through the line 198 while the time slot is generated by the flip-flop 40, the AND gate 196 generates a positive voltage across the resistor 202 to bias the transistor 178 into nonconduction which turns off the SCR 176 and deenergizes the flasher 172.

Figure 4:
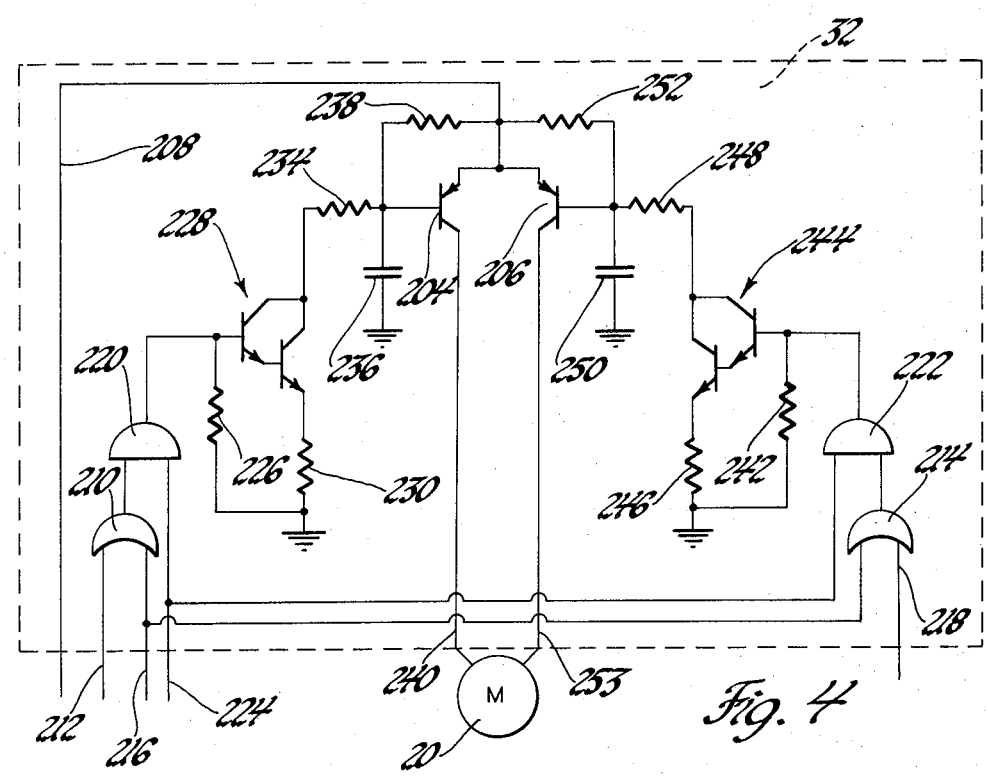
FIG. 4 is a schematic drawing illustrating the window control circuits of FIG. 1.

Referring to FIG. 4, the window control circuit 32 is illustrated, it being understood that the window control circuit 34 is identical thereto. Power from the line 70 is applied to the emitter electrodes of a PNP transistor 204 and a PNP transistor 206 through a line 208. The J input of the flip-flop 42 is coupled to one input of an EXCLUSIVE OR gate 210 through a line 212. The Q output of the flip-flop 42 corresponding to the J input of the flip-flop 44 is coupled to a second input of the EXCLUSIVE OR gate 210 and to an input of an EXCLUSIVE OR gate 214 through a line 216. The Q output of the flip-flop 44 is coupled to a second input of the EXCLUSIVE OR gate 214 through a line 218. The output of the EXCLUSIVE OR gate 210 is coupled to one input of an AND gate 220 and the output of the EXCLUSIVE OR gate 214 is coupled to one input of an AND gate 222. The address signal on the line 72 is coupled to respective second inputs of the AND gates 220 and 222 through a line 224. The output of the AND gate 220 is coupled to ground through a resistor 226 and to the base electrode of a Darlington amplifier 228 whose emitter electrode is coupled to ground through a resistor 230. The collector electrode thereof is coupled through a resistor 234 to the base electrode of the transistor 204 and to ground through a capacitor 236. A resistor 238 couples the base and emitter electrodes of the resistor 204. The collector electrode of the transistor 204 is coupled to the power window motor 20 through a line 240 and is effective when the transistor 204 is biased into conduction to drive the motor 20 to position the right window upward. The output of the AND gate 222 is coupled to ground through a resistor 242 and to the base electrode of a Darlington amplifier 244. The emitter electrode of the Darlington amplifier 44 is coupled to ground through a resistor 246 and the collector electrode thereof is coupled through a resistor 248 to the base electrode of the transistor 206 and to ground through a capacitor 250. A resistor 252 couples the collector and base electrodes of the transistor 206. The collector electrode of the transistor 206 is coupled to the power window motor 20 through a line 253. When the transistor 206 is biased into conduction, the power window motor 20 is driven to position the right window downward. When an address signal and a time slot generated by the flip-flop 42 occur simultaneously, the Darlington amplifier 228 is biased into conduction to bias the transistor 204 into conduction to effect energization of the power window motor 20 to position the right window upward. Conversely, when an address signal and a time slot generated by flip-flop 44 occur simultaneously, the Darlington amplifier 24 is biased into conduction to bias the transistor 206 into conduction to effect energization of the power window motor 20 to position the right window downward.

Although the preferred embodiment illustrates the invention as controlling turn signal lamps and power window motors, it will be understood by one skilled in the art that any number of additional functions of either form of control may be provided for, such as headlamp control, back-up lamp control, radio control, windshield wiper control, etc.

The detailed description of the preferred embodiment of the invention for the purpose of explaining the principle thereof is not to be considered as limiting or restricting the invention, since many modifications may be made by the exercise of skill in the art without departing from the scope of the invention.

I claim:

1. A vehicle multiplex system comprising: a plurality of electrically operated circuits to be selectively energized so as to perform prescribed functions, said plurality of electrically operated circuits being comprised of first and second groups; means for generating clock pulses; means coupled to the last mentioned means and responsive to the clock pulses for cyclically generating a number of sequential time slots, each of said time slots representing the time period during which a respective one of the plurality of electrically operated circuits may be energized; a first number of manually operable switch means for effecting the energization of respective electrically operated circuits in the first group; a second number of manually operable switch means for effecting the energization of respective electrically operated circuits in the second group; means coupled to the first number of manually operable switch means and responsive to the operation of a selected one of said switch means for generating a first signal simultaneous with the time slots which represents the time period during which the electrically operated circuit whose energization is effected by said selected switch means may be energized; means coupled to the second number of manually operable switch means and responsive to the operation of a selected one of said switch means for generating a second signal simultaneous with the time slot which represents the time period during which the electrically operated circuit whose energization is affected by said selected switch means may be energized; means coupled to the means for generating the second signal and the means for generating clock pulses for inhibiting further clock pulses while the second signal is being generated to extend the duration of the time slot coexisting with said second signal; means responsive to the first and second signals for generating an address signal; means responsive to the coexistence of the address signal and one of the time slots representing the time period during which a respective one of a plurality of electrical circuits may be energized for energizing said circuit; and a priority circuit coupled to the first number of manually operable switch means for disabling the means for generating the second signal when one of said first number of switch means is operated, whereby the first number of manually operable switch means are effective for selectively energizing one of the electrically operated circuits in the first group while one of the second number of manually operable switch means is operated.

2. A vehicle multiplex system comprising: a plurality of electrically operated circuits to be selectively energized so as to perform prescribed functions, said plurality of electrically operated circuits being comprised of first and second groups; means for generating clock pulses; means coupled to the last mentioned means and responsive to the clock pulses for cyclically generating a number of sequential time slots, each of said time slots representing the time period during which a respective one of the plurality of electrically operated circuits may be energized; and a control circuit, said control circuit comprising means for generating a respective unique identifying signal for each time slot and coexisting therewith, a first number of manually operable switch means for effecting the energization of respective electrically operated circuits in the first group, a second number of manually operable switch means for effecting the energization of respective electrically operated circuits in the second group, first gate means coupled to the first number of manually operable switch means and the means for generating an identifying signal and responsive to the operation of a selected one of said first number of switch means to effect energization of the respective electrically operated circuit in the first group for generating a first signal during the identifying signal unique to the time slot representing the time period during which said electrically operated circuit may be energized, second gate means coupled to the second number of manually operable switch means and the means for generating an identifying signal and responsive to the operation of a selected one of said second number of switch means to effect energization of the respective electrically operated circuit in the second group for generating a second signal during the identifying signal unique to the time slot representing the time period during which said electrically operated circuit may be energized, means coupled to the means for generating the second signal and the means for generating clock pulses for inhibiting further clock pulses while the second signal is being generated to extend the duration of the time slot coexisting with said second signal, means responsive to the first and second signals for generating an address signal, means responsive to the coexistence of the address signal and one of the time slots representing the time period during which a repsective one of the plurality of electrical circuits may be energized for energizing said circuit, and a priority circuit coupled to the first number of manually operable switch means for disabling the means for generating the second signal for a predetermined time period when one of said first number of manually operable switch means is actuated so as to permit the respective electrically operated circuit in the first group to perform the function prescribed thereto, whereby the first number of manually operable switch means are effective for selectively energizing one of the electrically operated circuits in the first group while one of the second number of manually operable switch means is operated.

* * * * *